United States Patent [19]

Moore et al.

[11] Patent Number: 4,808,823
[45] Date of Patent: Feb. 28, 1989

[54] THERMAL IMAGERS

[75] Inventors: William T. Moore, Buckhurst Hill; Alan S. Stuart, Loughton, both of United Kingdom

[73] Assignee: Rank Pullin Controls Limited, United Kingdom

[21] Appl. No.: 84,045

[22] Filed: Aug. 11, 1987

[30] Foreign Application Priority Data

Aug. 13, 1986 [GB] United Kingdom ............... 8619738

[51] Int. Cl.$^4$ .......................... G02B 26/10; G02B 5/04
[52] U.S. Cl. ........................................ 250/334; 350/286
[58] Field of Search ............... 250/330, 331, 332, 333, 250/334, 578, 234, 235, 236; 358/113; 350/1.1, 1.2, 1.3, 1.4, 286

[56] References Cited

U.S. PATENT DOCUMENTS 4,679,891 7/1987 Roberts ........................... 350/1.4 X

*Primary Examiner*—Eugene R. LaRoche
*Assistant Examiner*—David Mis
*Attorney, Agent, or Firm*—Saidman, Sterne, Kessler & Goldstein

[57] ABSTRACT

An anamorphic optical system for use in a thermal imager with a sprite detector includes two or more optical elements, preferably prisms, which are shaped and positioned so that change in their refractive index with temperature and/or wavelength results in a lateral shifting of the output energy substantially without any change in direction. The energy passes through a focussing lens to the detector. As a result, the lateral shifting of the energy output by the anamorphic system does not affect the position of the image on the detector. This compensates for the effect of variations in refractive index of the materials of which the prisms are made, as a function of wavelength and/or temperature.

15 Claims, 5 Drawing Sheets

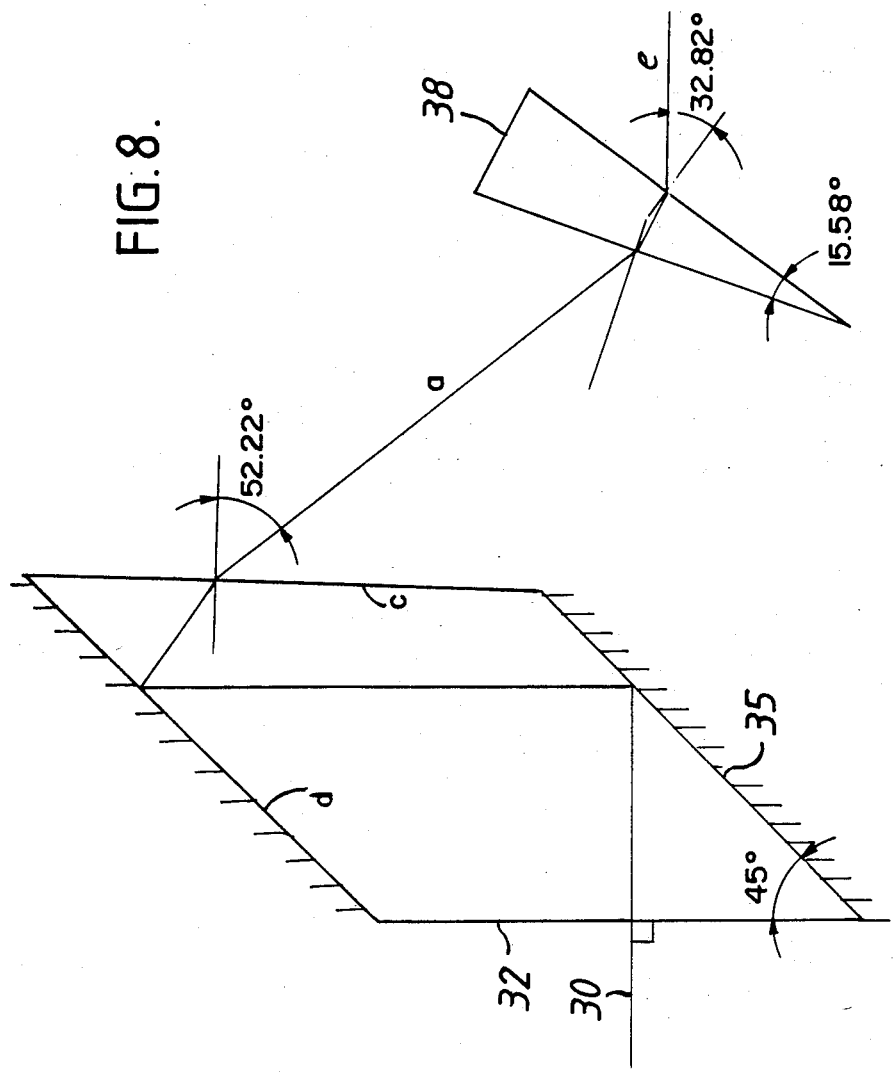

THERMAL IMAGERS

This invention relates to optical systems and is particularly concerned with optical systems in thermal imagers.

A well known form of thermal imager comprises an optical scanning arrangement which causes a thermal image to be scanned in both the horizontal and vertical directions across a thermal detector so that the detector produces a video output signal which, after appropriate processing, may be used to produce a visible image on a suitable display device such as a cathode ray tube. Typically the scanning optical system comprises two coaxial rotating polygonal mirrors which together perform the required scanning or a single polygonal mirror which performs a horizontal scanning and an oscillating mirror which performs the vertical scanning.

A known form of detector, called "sprite" detector, comprises one or more strips of thermally responsive material extending in the horizontal line direction and electrically biassed so that charge carriers generated in the strip at one end by a given pixel move along the strip towards the other end in synchronism with the movement of the pixel and are extracted at said other end in order in form the video signal. Such a detector provides a good signal to noise ratio. However, the carriers generated in the strip tend to diffuse as they move along the strip in synchronism with the pixel which has generated them and as a result, carriers from one pixel may diffuse into the next thereby reducing the sharpness of the image. It has been proposed to provide anamorphic optical elements in the optical system so as to magnify the pixels in the horizontal scanning direction and thereby reduce the diffusion of carriers from one pixel to the next. However, the problem with such anamorphic elements is that they are sensitive to temperature changes. More particularly, the material from which these elements are made may have a high rate of change of refractive index with temperature variation.

An object of the invention is to provide an improved optical system in which compensation for variation in a parameter thereof is provided.

Another object of the invention is to provide an anamorphic optical system, preferably for use in a thermal imager, in which variation in refractive index of an element of said system with temperature, is compensated.

The invention is described further by way of example with reference to the accompanying drawings in which:

FIG. 8 shows a further embodiment of the invention.

Figure 1:
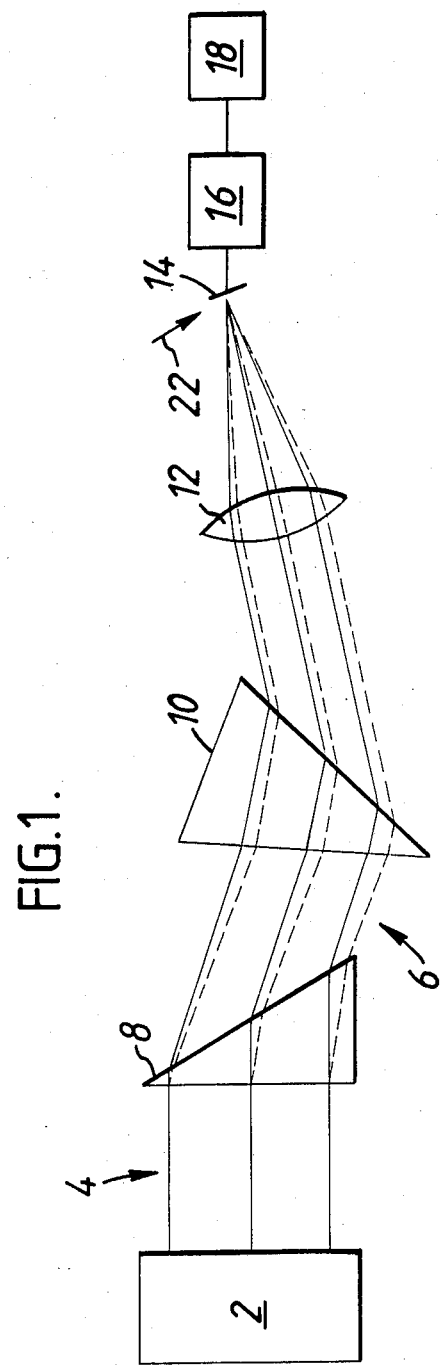
FIG. 1 is a diagram of a thermal imager incorporating an embodiment of the present invention.

With reference to FIG. 1, a thermal scanning arrangement 2 receives thermal energy from a field of view (not shown) and supplies the thermal energy in the form of a collimated beam 4 to an anamorphic optical system 6 comprising first and second prisms 8, 10 inverted relative to each other, a collimating lens 12, a sprite detector array 14 onto which the thermal energy is focussed by the lens 12, signal processing electronics 16 which receives a video signal from the detector array 14 and a display device 18, such as a cathode ray tube.

Figure 2:
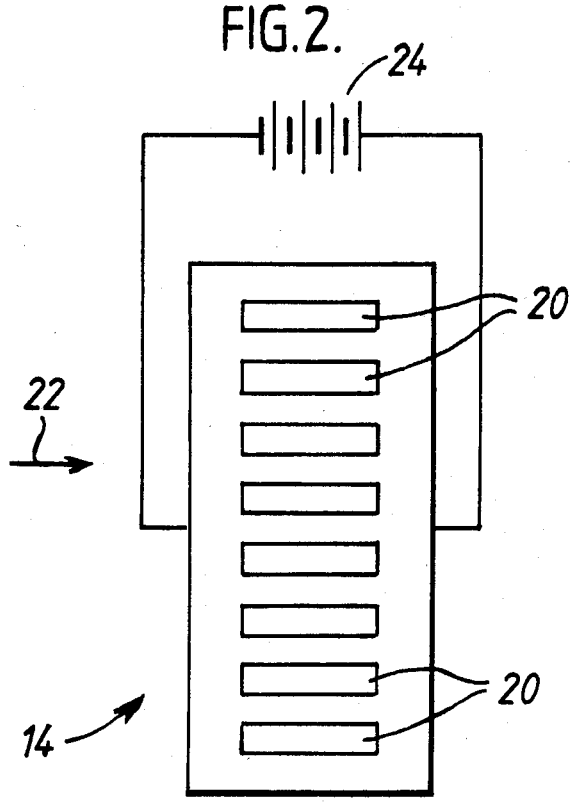
FIG. 2 is a diagram illustrating a thermal detector included in the thermal imager of FIG. 1.

The sprite detector 14, as shown in FIG. 2, comprises an array of eight detector elements 20 each being a strip of thermally responsive material, such as cadmium-mercury-telluride. The scanner 2 and associated optical elements 6 to 12 cause a real thermal image to be scanned across the detector array 14. Each element 2 extends parallel to the horizontal scan direction of the image represented by arrow 22 in both FIG. 1 and FIG. 2. Thus, as the image scans across the detector array 14, the elements 20 produce a swathe of eight video signals corresponding to eight different lines. The energy representing a given pixel incident on a given one of the detector elements 20 generates charge carriers therein and, as is well known, a biassing arrangement represented by 24 in FIG. 2 causes the charge carriers to drift along the strip in synchronism with the movement of the pixel. The function of the anamorphic optical system 6 is to enlarge the thermal image on the detector in the horizontal direction and consequently enlarge each pixel in the horizontal direction. This reduces diffusion of carriers from one pixel to the next and thereby increases the sharpness of the image.

A problem which arises is that the optical elements in thermal imaging systems are generally made of materials, such as germanium, which have a high coefficient of thermal change of refractive index. Further, optical elements made of these materials provide chromatic aberration in the thermal wavelengths. In accordance with the present invention, the prisms 6 and 8 are arranged so that chromatic aberration in the prisms and changes in refractive index due to temperature merely result in lateral displacement of the beam incident on the lens 12 so that the lateral displacement of certain wavelengths and/or the lateral displacement of the beam due to refractive index changes does not result in a change in the position of the image on the detector array. Thus, FIG. 1 illustrates in broken lines the beam path which might arise due to chromatic aberration or changes in refractive index with temperature.

Figure 3:
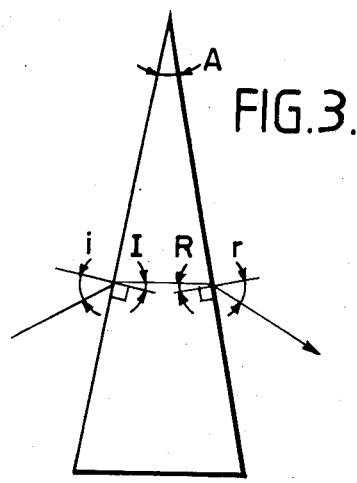
FIG. 3 is a diagram of a prism to assist in understanding the way in which the invention works.

In order to explain how this is achieved, reference will first be made to FIG. 3 which shows a prism with a ray passing through. As shown, the incident ray is at an angle of incidentce i and the output ray is at an angle of refraction r and the angle between the faces through which the ray passes is A. If i varies, r will vary by an amount dependent upon the magnification M produced by the prism (in one dimension only), where:

$$M = \frac{-dr}{di}$$

But $\sin i = n \sin I$ $\sin r = n \sin R$

Where n is the refractive index of the prism. Also $$I + R = A$$

Differentiating these equations (n constant).

$$di \cos i = n \, dI \cos I$$

$$dr \cos r = nd R \cos R$$

$$dI + dR = 0$$

which solve to give $$M = \frac{-dr}{di} = \frac{\cos R \cos i}{\cos r \cos I}$$

R and I are quite small so that cos I and cos R are both near to unity so that cos I and cos R substantially cancel. However r and i are relatively large angles and if r is greater than i then cos i will be greater than cos r and the magnification M will be greater than 1. The effect on the angle r of variation of refractive index with wavelength or temperature can be computed by differentiating with respect to wavelength or temperature respectively. Thus, in the case of wavelength;

$$C = \frac{dr}{d\lambda} = \frac{dr}{dn} \cdot \frac{dn}{d\lambda}$$

where
$\lambda$ is wavelength
C is the chromatic aberration.
Utilising the above equation, it can be shown that:

$$C = K (\tan r + M \tan i)$$

where $$K = \frac{1}{n} \cdot \frac{dn}{d\lambda}$$

Similar equations apply where refractive index changes with temperature. Thus:

$$\frac{dr}{dT} = \frac{dr}{dn} \cdot \frac{dn}{dT}$$

where T is temperature.

In the anamorphic system 6 shown in FIG. 1, if the magnification provided by prism 8 is $M_1$ and the magnification provided by prism 10 is $M_2$ then the total magnification M is given by the equation:

$$M = M_1 M_2$$

and the total chromatic error C is given by the equation:

$$C = M_2 C_1 - C_2$$

where $C_1$ and $C_2$ are the chromatic aberrations of the respective prisms 8 and 10.

Thus, it will be seen that chromatic error may be eliminated by choosing the condition:

$$C_2 = M_2 C_1 \qquad \text{Equation I}$$

From the above analysis:

$$C_1 = K (\tan r_1 + M_1 \tan i_1)$$

-continued $$C_2 = K (\tan r_2 + M_2 \tan i_2)$$

$$M_1 = \frac{\cos R_1 \cos i_1}{\cos r_1 \cos I_1}$$

$$M_2 = \frac{\cos R_2 \cos i_2}{\cos r_2 \cos I_2}$$

The suffixes "1" and "2" apply to the first and second prisms 8 and 10 respectively.

Accordingly, the various angles can be calculated to satisfy equation I.

Figure 4:
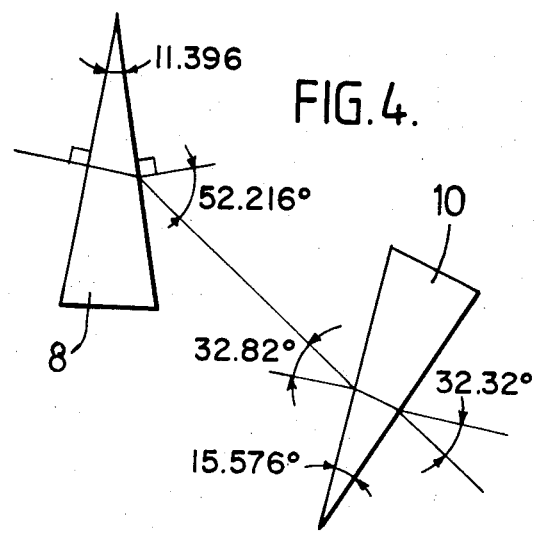
FIG. 4 shows in more detail an arrangement of a pair of prisms included in the thermal imager of Figure 1.
Figure 5:
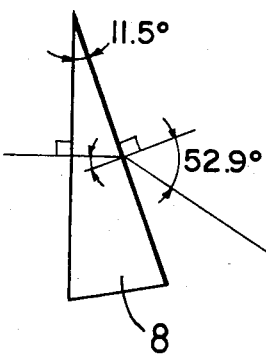
FIG. 5 is a diagram similar to FIG. 4 but showing different prisms.

FIG. 4 and FIG. 5 show two examples, where the refractive index of the material n=4.

In FIG. 4, i=r so $M_2=1$ by symmetry for prism 10. Hence $M_2 C_1 = K \tan 52.216 = 1.29$ K. and $C_2 = 2$ K tan $32.82 = 1.29$ K. For this system, $M = M_1 = 1.6$.

For FIG. 5, $\sin (r_2) = 4 \sin (10)$ for prism 10. so $$r_2 44°$$

and $$M_2 = 1.37 = \cos (10)/\cos(44)$$

$$C_2 = K \tan (44°) = 0.966 \text{ K}$$

It is therefore necessary to choose $C_1 = 1.37 \times 0.966$ K which gives $r_1 = 52.9°$.

Both prisms should be of the same material and if this condition is satisfied, the optical system will be substantially immune (within limits) both to variation in refractive index with wavelength and variation in refractive index with temperature. Otherwise, the arrangement needed to be immune to temperature variations will be different from that needed to be immune to wavelength variations.

Figure 6:
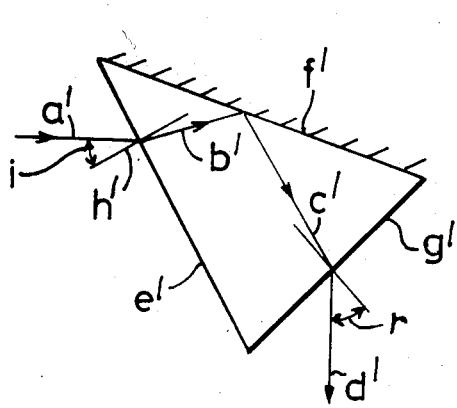
FIG. 6 is a diagram of an alternative form of prism in which the output rays are turned through 90 degrees relative to the input rays.
Figure 7:
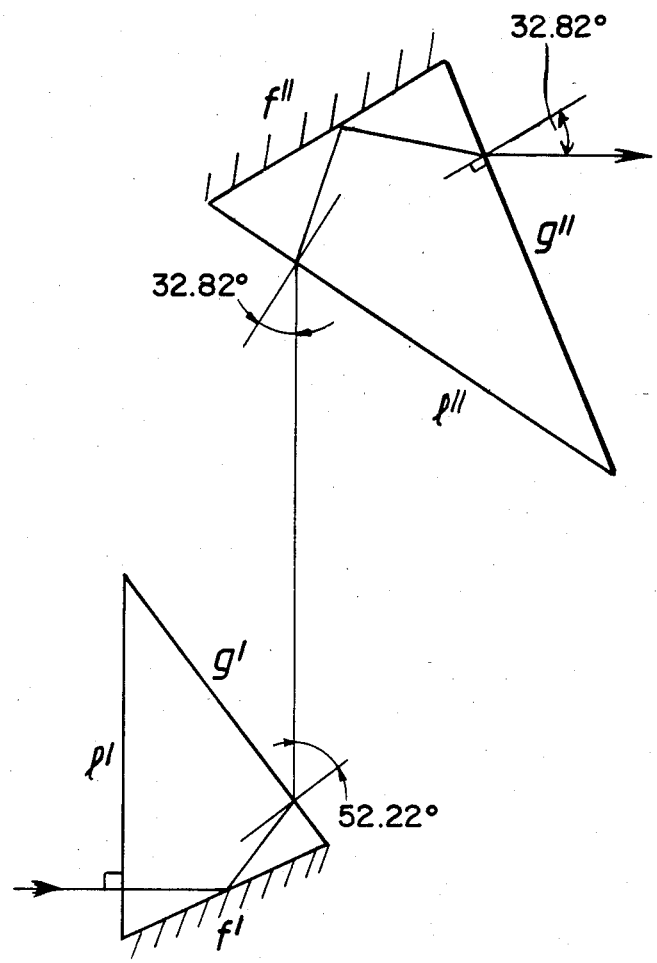
FIG. 7 illustrates an embodiment of the invention using a pair of prisms similar to that shown in Figure 6.

In the embodiments of FIGS. 4 and 5, the direction of the rays output from the anamorphic system 6 is different from the direction in which the rays are input. FIG. 6 shows a prism which has the effect of turning the radiation through 90 degrees and FIG. 7 shows an arrangement utilising two prisms similar to FIG. 6 whereby the output radiation is parallel with the input radiation.

With reference to FIG. 6, the incident radiation a' is refracted at the input surface e' and follows path b' to be reflected internally at silvered surface f' (which may be silvered if necessary) of the prism along path c' and the output radiation is refracted at surface g' to follow path d' which is at 90 degrees to path a'. The ray paths a' to d' and surfaces e', f' and g' have the following angles to the vertical or 12 o'clock direction in the drawings:

$$a' = 90°$$

$$h' = 90° - i$$

$$b' = h' + \sin^{-1}(0.25 \sin (i))$$
$$= 90° - i + \sin^{-1}(0.25 \sin (i))$$

$$d' = 180°$$

$$c' = 180° - + \sin^{-1}(0.25 \sin (r))$$

where $$f' = 0.50 (b' + c') = 135° - 0.50 (i + r) +$$

-continued $$0.50 \sin^{-1}(0.25 \sin(i)) + 0.50 \sin^{-1}(0.25 \sin^{-1}(i))$$

$$e' = h - 90° = -i$$

$$a' = d' + 90 - r - 270° - r$$

Thus, the path d' can be made to be at right angles to the path a'.

Utilising these properties, FIG. 7 shows an arrangement of two such prisms which have respectively silvered surface f' and f" whereby an output ray d" parallel to the input ray a' is produced. The angles of the surfaces of these prisms to the 12 o'clock vertical direction are as follows:

$e' = 0°$
$g' = 90° + 52.22° = 142.22°$
$f' = 45° + 0.50 (52.22 - 11.40) = 65.41°$
$e'' = 90° + 32.82° = 122.82°$
$f'' = 45° + 32.82° - 7.79° = 70.03°$
$g'' = 32.82°$

FIG. 8 shows an alternative embodiment in which the output rays are parallel to the input rays. In this embodiment, the input ray 30 is normal to a surface 32 (which is arranged vertically in the drawings) of a prism 34 having a first reflective surface 36 at 45 degrees to the surface 32. A second reflective surface d is provided to which the radiation is reflected from the surface 36 and the radiation reflected from the surface d exits through a surface c and passes to a triangular prism 38 as shown. The portion of the ray passing from surface d to surface c of prism 34 is labelled b and the portion of the ray passing from surface c to prism 38 is labelled a, the output beam being labelled e.

The angles which the various surfaces labelled with letters in FIG. 8, and the various rays similarly labelled, make to the vertical (12 o'clock) direction are as follows:

$$e = 90°$$

$$a = 90° + 2 \times 32.82° - 15.5$$
$$= 140.06$$

$$c = a + 90 - 52.22$$
$$= 177.84$$

$$b = a - 52.22 + 11.40$$
$$= 99.24$$

$$d = 0.50 (0 + 99.24) = 49.62$$

Various modifications are possible within the scope of the invention. For example, although the anamorphic optical system in the illustrated embodiments comprises only two prisms, more could be included. In this case, the values $C_1$, $C_2$, $M_1$, $M_2$ for first and second groups of prisms could be used in calculating the required angles to satisfy Equation I.

Thus the invention provides a means for achieving both achromatisation and athermalisation passively and the arrangements of FIGS. 7 and 8 result in the input and output rays being parallel.

We claim:

1. A thermal imager comprising thermal detector means; scanning means for scanning a thermal image across said detector means; and an anamorphic optical system between said scanning means and said detector means; said anamorphic optical system comprising first and second optical means arranged in series and satisfying the equation:

$$C_2 = M_2 C_1$$

where $C_1$ and $C_2$ represent respectively errors introduced by the first and second optical means as a function of variation of refractive index with a parameter and $M_2$ represents a magnification factor of the second optical means to compensate at least partly for said errors.

2. A thermal imager according to claim 1, wherein each said optical means comprises prism means.

3. A thermal imager according to claim 2, wherein each said prism means consists of a single prism.

4. A thermal imager according to claim 3, wherein each said prism is a triangular prism arranged so that energy is transmitted therethrough substantially without internal reflection.

5. A thermal imager according to claim 3, wherein energy enters each prism at a first face thereof, is reflected internally at a second face thereof and leaves at a third face thereof so that energy leaving said anamorphic optical system is substantially parallel to energy entering said anamorphic optical system.

6. A thermal imager according to claim 5, wherein each said prism is a triangular prism.

7. A thermal imager according to claim 3, wherein one of said prisms comprises first and second generally opposed faces through which energy enters and leaves the prism respectively and third and fourth generally opposed faces at which energy is reflected inside the prism when travelling between said first and second faces.

8. A thermal imager according to claim 7, wherein the other said prism is a triangular prism and the energy passes therethrough without reflection.

9. A thermal imager according to claim 1, wherein said optical elements of said anamorphic optical system are all made of the same material.

10. A thermal imager according to claim 1, wherein said detector comprises at least one strip of thermally responsive material extending in a horizontal scan direction and said anamorphic optical system magnifies the image in said horizontal scan direction.

11. A thermal imager comprising thermal detector means; scanning means for scanning a thermal image across said detector means; and an anamorphic optical system between said scanning means and said detector means; said anamorphic optical system comprising a plurality of prisms arranged in series, said prisms all being of the same material and having faces so arranged that errors introduced by individual said prisms as a function of variation of refractive index with a parameter result in lateral displacement of energy output by said anamorphic optical system substantially without change in direction of said output energy; said imager further including a focusing lens for focusing energy from said anamorphic optical system onto said detector means.

12. A thermal imager comprising scanning means for scanning a field of view and producing a collimated beam of energy from said field of view; an anamorphic optical system arranged so that said collimated beam passes therethrough and is magnified in a predetermined scan direction, said anamorphic optical system comprising a plurality of optical elements made of a material whose refractive index varies as a function of at least one of wavelength of said energy and temperature of said material, said elements having their shapes and their positions predetermined so that variation in said refractive index results in a lateral displacement of said collimated beam output from said anamorphic optical system substantially without change of direction of said output beam; and focussing lens means arranged to receive said collimated beam from said anamorphic optical system and to focus energy therein to a predetermined position for forming at said predetermined position a scanning image during operation of said scanning means.

13. A thermal imager according to claim 12, wherein said optical elements are shaped and positioned so that said output beam of collimated energy from said anamorphic optical system is substantially parallel to said beam received by said anamorphic optical system.

14. A thermal imager according to claim 12, including thermal detector means positioned to receive energy from said scanning image, said thermal detector means comprising at least one strip of thermally responsive material extending in said predetermined scan direction and bias means arranged to cause carriers generated in said strip to move therealong substantially in synchronism with said scanning thermal image.

15. A thermal imager according to claim 14, in combination with signal processing means connected to said detector means for receiving a video signal therefrom and processing said signal, and display means operable to produce a visible image in response to signals from said signal processing means.

* * * * *